July 30, 1940.   J. L. ANDERSON   2,209,373
APPARATUS FOR WELDING
Filed March 16, 1939
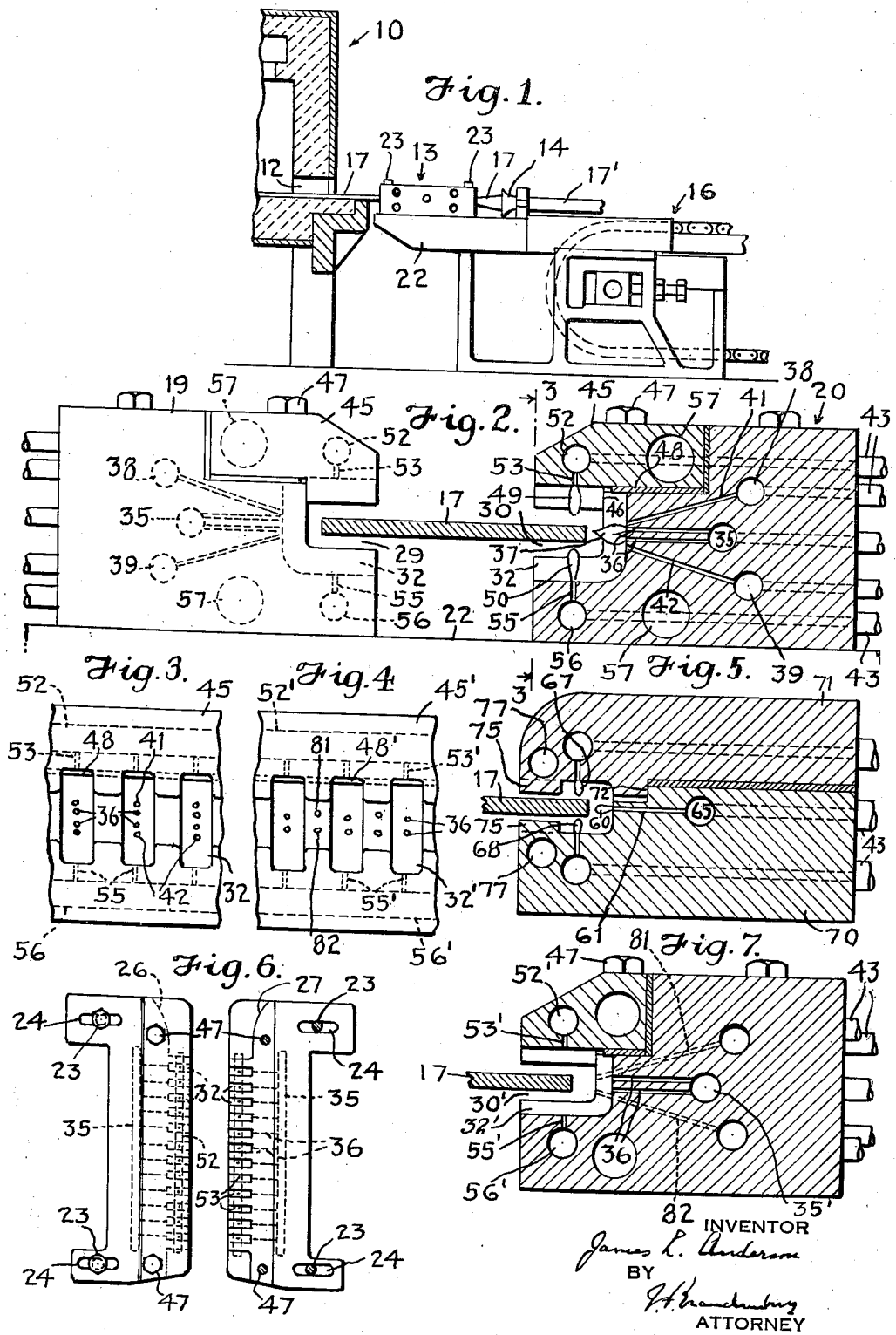

Patented July 30, 1940

2,209,373

UNITED STATES PATENT OFFICE 2,209,373

APPARATUS FOR WELDING

James L. Anderson, Closter, N. J., assignor to Air Reduction Company, Incorporated, New York, N. Y., a corporation of New York Application March 16, 1939, Serial No. 262,098

14 Claims. (Cl. 205—9)

This invention relates to apparatus for welding, and more particularly to retort construction for heating the metal edges that are to be joined. The invention is intended especially for heating the edge faces of a traveling skelp preparatory to bringing the edge faces together progressively in a tube welding machine, but the invention is not limited to such use.

In one of the most advantageous methods of making welded tubes, skelp is pulled from a furnace, in which the entire body of the skelp has been preheated, moved through a retort and then into forming and closing apparatus such as rolls or a stationary die or bell. While the skelp travels through the retort, the edge faces are heated locally to bring them to a welding condition before they are brought together to make the weld. The forming of the skelp and closing of the seam is sometimes done in roll passes instead of dies, and the edge heating may be done after the skelp is partly formed. The preheating furnace can be dispensed with, though the absence of preheating reduces the speed and economy of the process.

It is an object of this invention to provide improved apparatus for heating metal edges and especially for heating such edges in accordance with the methods disclosed in my application Serial No. 164,440, filed September 18, 1937, of which this application is a continuation in part.

It is an object of the invention to effect a more rapid heating of the edge faces of a moving skelp so that with a given length of retort the welding process can proceed at higher speed. One way in which the invention increases the rate of heating is by checking conduction losses from edge faces against which heating agencies are directly projected. Raising the temperature of the edges at a rapid rate within a short distance instead of at a slower rate over considerably longer space is particularly important when equipping existing pipe and tube mills to manufacture by the more modern edge heating methods. In such cases, slight differences in retort length often determine whether or not the mill must be rebuilt to equip it for modern high-speed methods.

Another object of the invention is to provide apparatus for heating the edge faces of a traveling skelp rapidly and effectively, with less preheating, and with greater economy than in the prior art. Apparatus for directing oxygen or air blasts against the edge faces of the skelp have been used in the past to increase the temperature of the edges, but the use of such apparatus has numerous disadvantages, among which is the fact that the skelp must be heated above its kindling temperature in the furnace in order to make the air and oxygen blasts effective. Another disadvantage is that any substantial amount of heating by means of oxygen blasts burns the metal edges excessively, causing a considerable loss in metal. Heating with oxyacetylene flame jets has proved more advantageous.

In accordance with one feature of this invention the effectiveness of a system of oxy-fuel gas heating flames, such as oxyacetylene flames, is increased by means of oxygen streams related to the flame jets in a manner which obtains a co-operative heating. The extra heating gained by the use of additional oxygen increases the economy of the heating because the oxygen streams are heated by the oxy-fuel gas flames, and the envelope gases of the oxy-fuel gas flames do more effective heating, and because the cost of oxygen is less than that of acetylene. I find that with some grades of skelp, ratios as high as 5 parts of oxygen to 2 of acetylene can be used with this invention without objectionable burning of the edges.

Another object of the invention is to provide a retort construction which requires no torch in the retort, the gas passages and orifices being located in the body of the retort itself.

Other objects, features and advantages of the invention will appear or be pointed out as the specification proceeds.

In the accompanying drawing, forming part hereof:

Fig. 1 is a fragmentary side view, partly in section, of tube welding apparatus embodying the invention;

Fig. 2 is a greatly enlarged end view of the retort of Fig. 1, the right-hand portion of the retort being shown in section;

Fig. 3 is a view taken on the line 3—3 of Fig. 2 with its skelp removed;

Fig. 4 is a view similar to Fig. 3, but showing a modified form of the invention;

Fig. 5 is a sectional view similar to the right-hand portion of Fig. 2, but showing a second modified form of the invention;

Fig. 6 is an enlarged plan view of the retort of Fig. 1 with the skelp omitted and the cover of one of the retort blocks removed; and Fig. 7 is a sectional view similar to Fig. 5, but showing the modified form of the invention similar to that illustrated in Fig. 4.

The tube welding apparatus shown in Fig. 1 includes a furnace 10 in which skelp is preheated. The furnace has a mouth 12 and there is a retort 13 located near the mouth of the furnace so that as the skelp is pulled from the furnace it passes through the retort, where local heating brings the edges of the skelp to a welding condition.

A closing die or bell 14, just beyond the retort 13, bends the skelp to tubular form and brings the edges together to make a weld. The skelp is pulled from the furnace 10 and through the retort 13 and bell 14 by a drawbench 16. The skelp is indicated by the reference character 17 and the welded tube by the reference character 17'.

The equipment shown in Fig. 1 is representative of welding apparatus. The retort 13 can be used without a furnace for preheating the skelp, though a furnace reduces the amount of heating that the retort is called upon to do and thereby increases the speed and economy of the welding. The forming and welding of the tube may be done in other welding apparatus, and other expedients can be employed instead of the drawbench.

The retort 13 comprises left and right-hand portions 19 and 20, respectively, spaced from one another and fastened to a base 22 by screws 23. These screws extend through slots 24 (Fig. 6) in the retort. The slots make it possible to adjust the spacing of the right and left-hand portions of the retort to accommodate different widths of skelp.

There are guide surfaces 26, 27 forming a flaring entrance through which skelp is pulled into the retort. The edges of the skelp travel through confronting guideways or channels 29 and 30 (Fig. 2). The walls of the channels have transversely extending grooves 32. The right-hand portion 20 of the retort is shown in section in Fig. 2, and it includes a block containing a number of gas chambers extending lengthwise of the block. The retort blocks are preferably castings.

These chambers include a central chamber 35 from which a row of jet orifices 36 extend through a wall of the channel 30, each of the jet orifices 36 opening into one of the grooves 32 and being disposed to project a jet directly against the edge face of the skelp 17. The drawing shows a double row of jet orifices 36, but most of the advantages of the invention can be obtained with a construction having only a single row of jet orifices communicating with the central chamber 35.

Upper and lower chambers 38 and 39 in the block 34 have converging jet passages 41 and 42 which open into the grooves 32 a short distance above and below the jet passages 36, as shown in Fig. 3. By supplying a mixture of oxygen and fuel gas, preferably acetylene, to the central chamber 35, oxy-fuel gas heating flames 37 can be projected against the edge face of the skelp. Oxygen, either commercially pure or diluted with inert gases, is supplied to the chambers 38 and 39. This oxygen is under pressure which causes streams of oxygen to issue from the jet orifices 41, 42, and these streams, being at an angle to the heating flames 37, distort the flames into flatter and broader flames, which effect a more intense heating of the edge faces of the skelp. The oxygen causes the envelope gases that surround the oxy-fuel gas heating flames 37 to burn with a hotter flame and within a smaller space so that the envelope gases are more efficiently used. The oxygen streams may issue from their orifices at lower velocities than used for the oxy-fuel gas mixtures of the flame jets.

The same apparatus can be used in a different way by supplying the oxygen and fuel gas mixture to each of the upper and lower chambers 38, 39 and the oxygen to the center chamber 35. When the jets are in such relation, however, the heating effect of the flames is less concentrated and oxygen is generally supplied in sufficient quantity to obtain a substantial amount of heat by burning of the metal. With the preferred relation where the center flames 37 are flanked by streams of oxygen from the orifices 41, 42, the amount of oxygen supplied through these orifices may be only enough to cause intense and concentrated combustion of the envelope gases in the immediate vicinity of the skelp edges, in which case no burning of the metal occurs.

The separate passages in the retort blocks through which gases are supplied to the chambers 35, 38, 39, and to other gas chambers to be described, from supply pipes 43, are indicated by dotted lines in the sectional views.

A removable cover 45 has a grooved face which forms the upper wall of the channel 30 and has a shoulder 46 which abuts against the block 34 to position the cover accurately on the block. A shim 48 between the block 34 and cover 45 determines the width of the open side of the channel 30. The cover 45 is fastened in place by screws 47.

The edge faces of the skelp can be heated more quickly if conduction losses from them back into the body of the skelp are checked. This result is obtained by projecting rows of heating flames against the upper or lower, or both, surfaces of the skelp a short distance back of the edge faces. Heating flames 49, 50 for checking conduction losses are shown in Fig. 2. An oxy-fuel gas mixture for the heating flames 49 is supplied from a chamber 52 through jet orifices 53 in the cover 45, while gas for the heating flames 50 is supplied through jet orifices 55 from a chamber 56 in the block 34. Passages 57 for cooling fluid are provided in the cover 45 and block 34.

The construction of the left-hand portion 19 of the retort is similar to that of the right-hand portion described above with the necessary reversals to permit it to function on the opposite side of the skelp. The channels 29 and 30 are guideways for the skelp 17 and serve to smooth out any waves in the skelp or to prevent any substantial displacement of the edges away from the heating agencies.

Fig. 5 shows a modified form of the invention in which the edge face of the skelp 17 is heated by a row of flames 60 each of which issues from a jet orifice 61 extending through a wall of the lower block of the retort and communicating with a chamber 65 extending lengthwise of the retort and corresponding to the chamber 35 of the retort shown in Fig. 2. Heat losses by conduction from the edge faces of the skelp are checked in the retort of Fig. 5 by heating flames 67, 68 directed against the upper and lower surfaces of the skelp in the same manner as the flames 49, 50 previously described. Oxygen jets instead of flames may be projected from the orifices 61 when substantial burning of the skelp edges is not objectionable. In such a case the flames 67, 68 check conduction losses so that less metal has to be burned to raise the temperature than has been the case with oxygen blast methods of the prior art.

The retort of Fig. 5 has a lower block 70 and an upper or cover block 71. These blocks abut along shoulders 72 and are vertically spaced by a shim 73 to obtain the desired channel height for the skelp. The guideway or channel between the blocks 70, 71 differs from that of Fig. 2 in that ribs 75 extending only a part of the way across the upper and lower walls of the channel are provided instead of grooved channels such as shown in Fig. 2. The blocks 70, 71 are provided with cooling chambers 77.

Figs. 4 and 7 show embodiments of the invention which have the same flame heating facilities as Fig. 2 but which supplement the flame heating by a different use of oxygen streams. Each of the flame jet orifices, the chambers which supply them with gas, and the upper and lower parts of the retort are indicated by the same reference character as in Fig. 2 with a prime appended. Instead of supplying oxygen streams near the flame jets, as in Fig. 2, however, the retort of Figs. 4 and 7 has jet orifices 81, 82 which open through the wall of the channel 30' at points substantially midway between heating flames.

This relation of jets subjects a traveling skelp to alternate applications of flame heating and oxygen. Both expedients raise the temperature of the edges, but in a different way. The flames supply heat generated by the combustion of the gases which flow from the jet orifices. The oxygen, when supplied between heating jets in this manner causes the products of combustion of the primary heating flames to burn with great intensity close to the skelp edges and if sufficient oxygen is supplied it burns the edge faces to generate additional heat in the skelp as the edges pass between the heating flames.

The skelp is heated in a flat condition in all of the embodiments of the invention illustrated, but the invention can be employed with partially formed skelp. Other modifications can be made and some features of the invention used without others.

I claim:

1. Pipe or tube welding apparatus comprising a retort having guides through which the edges of a skelp travel, an elongated system of orifices extending in the direction of movement of the skelp, said orifices being disposed in positions to project heating flames directly against an edge face of the traveling skelp, and another system of orifices in position to direct flame jets against the skelp a short distance back of the edge face to reduce heat losses by conduction from said edge face.

2. In or for tube welding apparatus, an edge-heating retort including guides comprising channels through which the edges of a skelp move with longitudinal motion, jet orifices along the lengths of the channels in positions to project flames directly against the edge faces of the skelp as it travels through the retort, and other rows of orifices in position to direct flames against the upper and lower surfaces of the skelp a short distance back from each edge of the skelp to check heat losses by conduction from the edge face.

3. Apparatus for heating a metal edge to a welding condition including a guideway which receives the edge to be heated, an elongated system of orifices in position to project heating jets directly against the edge face to be heated to effect a progressive heating of the edge face during relative movement of the guideway and metal edge in the direction that the edge extends, and another elongated system of orifices in the guideway in position to direct flames against the metal part to be welded at a distance back from the edge face to check conduction losses from the edge face.

4. An edge-heating retort having spaced jet orifices located along a course that extends in the direction of relative longitudinal movement of the retort and a metal edge to be heated, and means for supplying the orifices with a mixture of oxygen and fuel gas for heating flames to raise the temperature of the edge face to a welding condition, and having other jet orifices adjacent to the heating flames and disposed to direct oxygen streams into the region of the metal edge that is heated by said flames, and means for causing oxygen streams to flow from said other orifices.

5. In an edge-heating retort through which a skelp is moved lengthwise preparatory to welding the edges, spaced jet orifices along the longitudinal course traveled by the skelp edges, means for supplying said orifices with a mixture of oxygen and fuel gas so that said orifices project heating flames or raising the temperature of the skelp edges, other jet orifices with their discharge ends adjacent to the flame jets and disposed to direct their jets toward the same skelp edge as their adjacent flame jets, and means for supplying oxygen without fuel gas to said other orifices.

6. Apparatus for heating the edge portions of a moving skelp including a retort having a series of spaced jet orifices along each edge portion of the skelp, means for supplying oxygen and fuel gas to said jet orifices to produce high-temperature heating flames, and another system of orifices associated with said jet orifices on each side of the skelp along the length of the edge and in position to introduce streams of oxygen into the region of the metal edge that is heated by the flames on the same side of the skelp as the orifices from which the oxygen streams are introduced.

7. Apparatus for heating the edge portions of a moving skelp including a retort having a series of spaced jet orifices along each edge portion of the skelp, means for supplying oxygen and fuel gas to said jet orifices to produce high-temperature heating flames, other jet orifices above and below the flame jet orifices, and means for supplying oxygen to the other jet orifices, said other orifices being disposed to direct their oxygen jets against the flame jets from both sides to flatten and spread the flame jets before the flame jets reach the edge portion of the skelp.

8. In a retort for heating the edge portion of a moving skelp, a guideway for each side of the skelp, means for heating each edge of the skelp including two substantially parallel rows of spaced jet orifices extending along the run of the skelp between the ends of the guideway, each jet orifice of one row being located above a jet orifice of the other row, means for supplying an oxy-fuel gas mixture to the orifices to produce two rows of high-temperature heating flames, other jet orifices in two rows, one row above the heating flames and the other below, each of the upper and lower of said other orifices being substantially in line with two flame jet orifices, and means for supplying oxygen to the said other orifices, the oxygen jet orifices converging toward the flame jet orifices so that the oxygen jets blow the upper and lower flame jets together to produce a flattened resultant flame.

9. A retort for heating the edges of a moving skelp, said retort having a guideway for each edge of the skelp, and a plurality of orifices along the run of each edge of the skelp between the ends of the guideways, said orifices extending in a direction to project jets against the edge portion of the skelp, a supply line for an oxy-fuel gas mixture communicating with alternate jets, and an oxygen supply line communicating with the other jets.

10. In an edge-heating retort, a plurality of jet orifices, each of which is located and disposed to direct a stream of gas against the edge portion of the skelp, a conduit for supplying a mixture of oxygen and fuel gas to alternate jet orifices to produce high-temperature heating flames, and another conduit supplying oxygen to the orifices between the flame jets.

11. In a retort for heating the edge of a moving skelp, a row of spaced orifices in position to project flame jets directly against the edge face of a skelp as it travels past the retort, and other jet orifices located one between each of the flame jets in the direction that the row of flame jets extends, and in position to project a stream of oxygen against the edge face between the regions where it is struck by the heating flames.

12. In a retort for heating the edge of a moving skelp, a block having a guideway comprising a channel recess into which an edge of the skelp extends and by which the skelp edge is guided during the passage of the skelp through the retort, a gas distributing chamber in the block, and a number of jet orifices spaced from one another along the length of the channel recess and extending through a wall of the channel recess and opening into the gas distributing chamber within the block.

13. A skelp-heating retort including right- and left-hand portions with guide channels into which the right- and left-hand edges of a moving skelp extend, each of said portions comprising two castings assembled in such relation that surfaces of the respective castings form confronting faces of the channel for one edge of the skelp, a distributing chamber in the casting, and spaced-apart jet passages along the length of the channel and opening through a wall of the channel into the distributing chamber within the casting.

14. A skelp-heating retort including right- and left-hand portions with channels for receiving the right- and left-hand edges of a moving skelp, each of said portions comprising a lower casting resting on and connected to a base, an upper casting supported on and attached to the lower casting, but spaced from the lower casting along its entire length and across at least a part of the width of each casting to form the channel for receiving one edge of the skelp, a plurality of gas distributing chambers in the lower castings, and at least one gas distributing chamber in the upper casting, two rows of substantially parallel jet passages leading from one of the distributing chambers of the lower casting and opening through the wall of the channel at spaced points in two rows lengthwise of the channel and in position to project gas streams directly against the edge face of a skelp passing through the retort, two other gas distributing chambers in the lower casting separate from the one with which said two rows of jet passages communicate, a row of jet passages leading from each of said other chambers, the jet passages from said other chambers converging toward one another and opening into the channel in positions to direct streams of gas diagonally against the edge face of the skelp, and still other gas distributing chambers, at least one of which is in each casting with jet passages opening through the top and bottom walls of the channel in positions to direct jets against the top and bottom surfaces of the skelp a short distance back of the edges.

JAMES L. ANDERSON.